Patented June 9, 1942

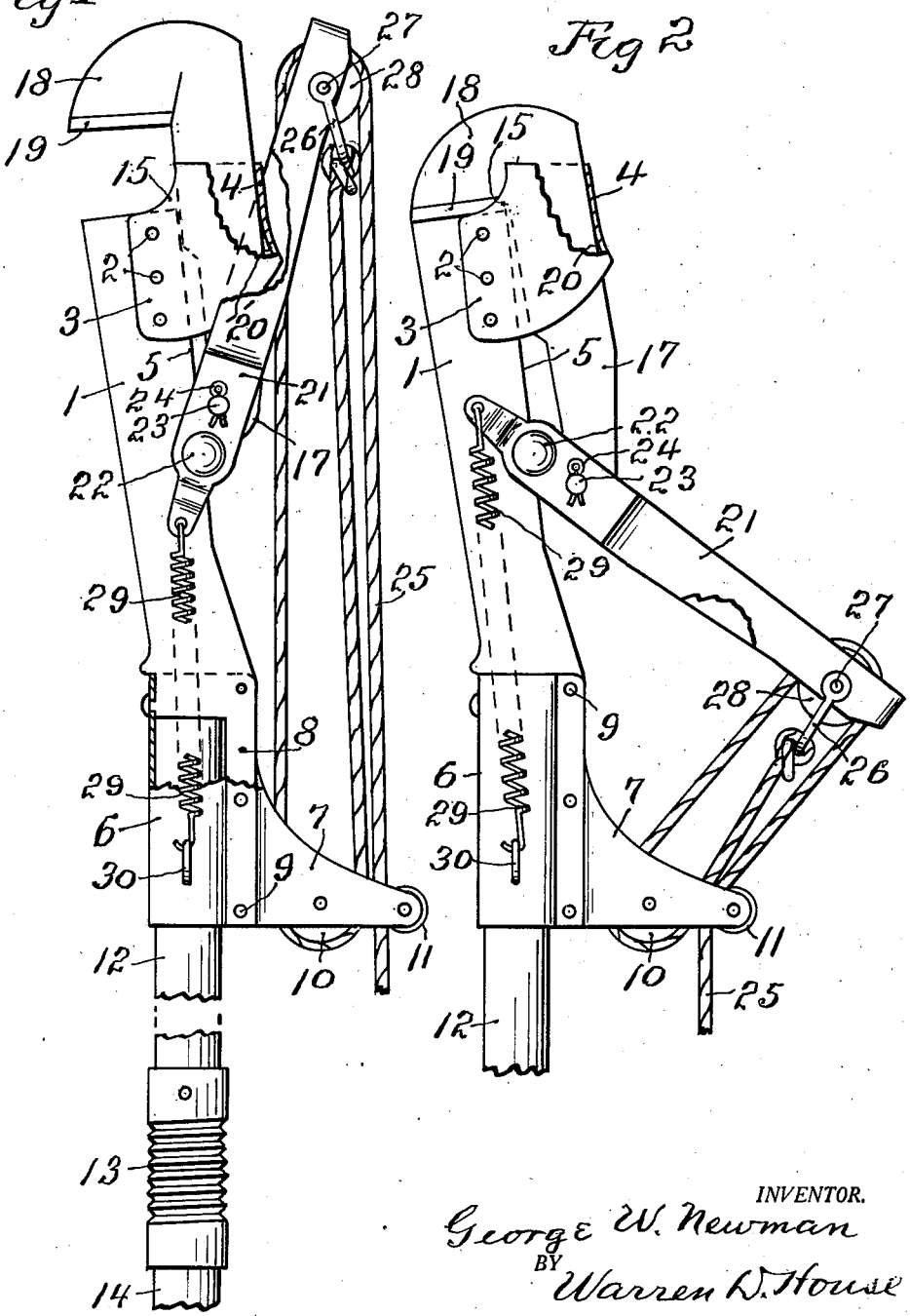

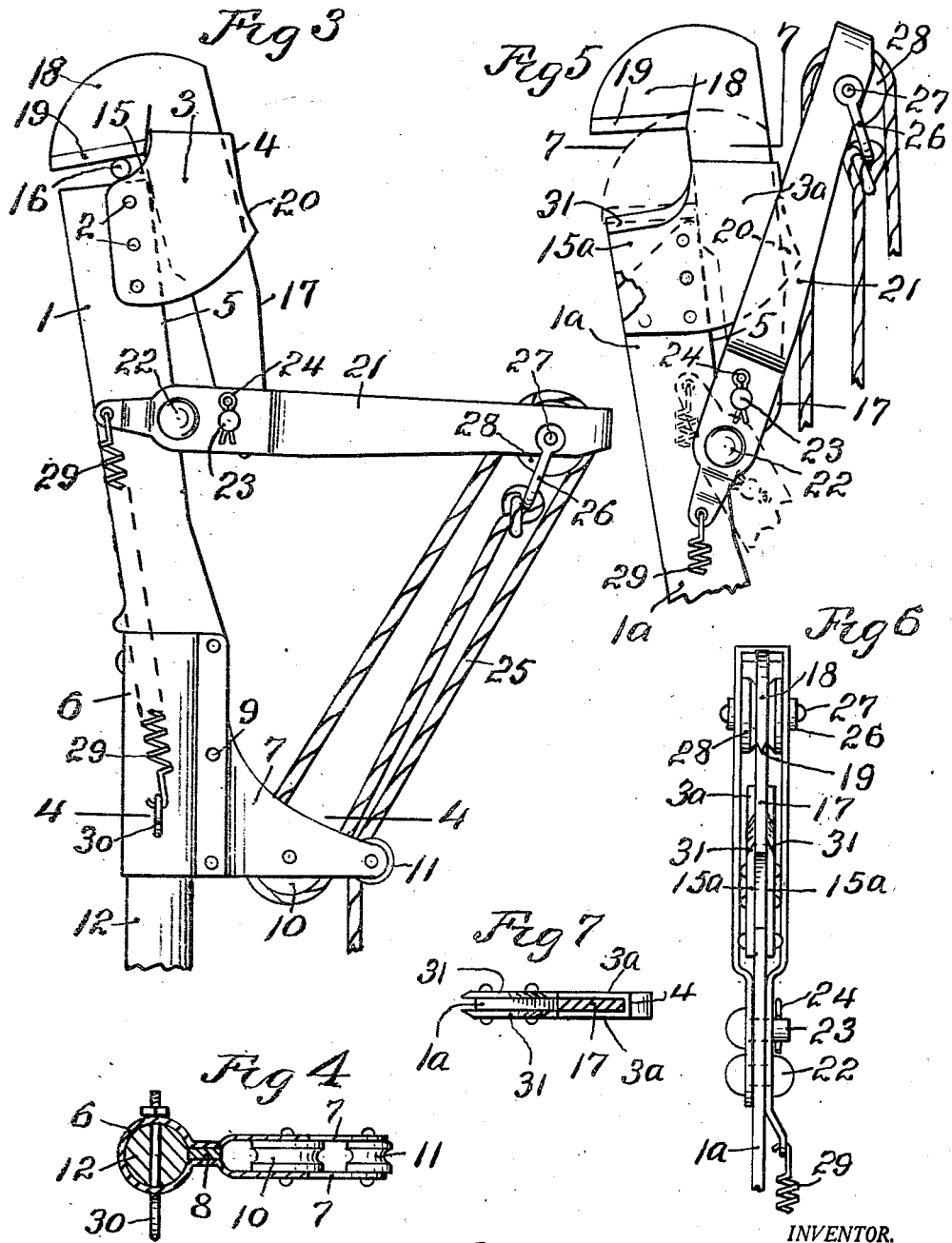

2,285,780

UNITED STATES PATENT OFFICE 2,285,780

PRUNING IMPLEMENT

George W. Newman, Kansas City, Mo.

Application July 12, 1941, Serial No. 402,101

10 Claims. (Cl. 30—245)

My invention relates to improvements in pruning implements, of the type having a movable jaw cooperating with a fixed jaw, for severing limbs and branches of trees or shrubs.

One of the objects of my invention is to provide a novel pruning implement of the kind described, which is simple in structure, strong, durable, not likely to get out of order, which will not become clogged in action, which will have a teetering movement of the movable jaw in the severing movement, and with which relatively large branches that will pass between its jaws can be easily severed.

The novel features of my invention are hereinafter fully described and claimed.

In the accompanying drawings, which illustrate my invention,

Fig. 1 is a side elevation, partly broken away of one form of my invention, showing the upper jaw fully opened.

Fig. 2 is a similar view of the form shown in Fig. 1, partly broken away, showing the movable jaw fully closed.

Fig. 3 is a view similar to Fig. 2, showing the upper jaw partly closed and showing an object that is of small diameter gripped between the jaws.

Fig. 4 is a section, with parts omitted, on the line 4—4 of Fig. 3.

Fig. 5 is a side elevation, partly broken away, of another form of my invention, showing the movable jaw in the fully open position, in solid lines, and in the fully closed position in dotted lines.

Fig. 6 is an edge elevation of what is shown in Fig. 5, parts being omitted, and parts broken away.

Fig. 7 is a section on the line 7—7 of Fig. 5.

Similar characters of reference designate similar parts in the different views.

Referring to Figs. 1 to 5, which illustrate one form of my invention, the lower fixed jaw comprises a longitudinal shank 1, which is a flat bar, to the opposite sides and upper end portion of which are fastened, as by rivets 2, the two flanges 3 of a channel member, the bridge 4 of which is next to and spaced from the adjacent longitudinal edge 5 of the shank 1.

For supporting the shank 1, there is provided a longitudinal tubular member 6, the upper end of which is fitted over the lower end portion of the shank 1, as shown in Fig. 1. The member 6 has two longitudinal side flanges 7 which are fastened to opposite sides of a downwardly extending stem 8 of the shank 1, as by rivets 9. The flanges 7 extend laterally from the stem 8 and have rotatably mounted between them two pulleys 10 and 11, which form part of a block and tackle means, hereinafter described.

The upper end of a longitudinal bar 12, forming part of a handle, is fitted in the tubular member 6, and has its lower end fastened in the upper end of a screw threaded sleeve 13, in which is removably fitted the threaded upper end of a supplemental handle bar 14, the lower portion of which is broken away, said supplemental handle bar 14 being used when needed.

The channel member flanges 3 extend above the adjacent end of the shank 1, and have portions 15 which slant downwardly at their upper ends in concave curves toward the said end of the shank 1, said projecting end portions 15 form bearings against which is adapted to bear the object to be cut, as a twig 16, Fig. 3.

In the form shown in Figs. 1, 2 and 3, the upper end of the shank 1 supports objects of larger diameters.

The movable jaw comprises a shank 17 from the outer end of which laterally extends an L portion 18 having a cutting edge 19 alined with the shank 1 in a plane between and parallel with the projecting portions 15 of the flanges 3.

The shank 17 is reciprocative in the channel member between the bridge 4 and the longitudinal edge 5 of the shank 1. The inner side of the bridge 4 has a convex portion starting at a point opposite the adjacent end of the shank 1 and extending to the inner end of the bridge. In its inward cutting movement the shank 17 slides against said convex portion 20 and the rear corner of the outer end of the shank 1.

For reciprocating the movable jaw 17—18, there is provided a U shaped lever 21 between the end portions of the arms of which are disposed the shanks 1 and 17, to which the lever is pivoted on two parallel axes comprising two bolts 22 and 23 respectively extending through the shanks 1 and 17, and the lever 21.

The bolt 23 is removable, and is releasably held in place by a removable cotter pin 24, thus permitting the movable jaw 17—18 to be removed for sharpening of its cutting edge 19.

When the lever 21 is swung from the position shown in Fig. 1, in which the L portion 18 is in the fully open position, to the position shown in Fig. 2, in which the L portion 18 is fully closed, the bolt 23 will cross a line extending transversely through the shank 1 and the pivot bolt 22, whereby the lever will impart to the movable jaw 17—18 a teetering movement, which will enable the cutting edge 19 to more easily sever the object to be severed.

When the movable jaw 17—18 is moving downwardly in a cutting movement, the shank 17 will be forced against the convex portion 20 and will slide against and be guided thereby.

When a small twig, such as the twig 16, Fig. 3, gets between the jaws and rests on the concave ends of the flange projections 15, the cutting edge 19 of the movable jaw 17—18 will engage the opposite side of the twig and will force it away from the shank 17 to a position over the adjacent end of the shank 1 where it will be severed by said cutting edge 19, and will be prevented from being crowded between the jaw shank 17 and the longitudinal edge 5 of the shank 1. Clogging between the jaws is thus prevented.

For increasing the severing power of the jaws, there is provided a block and tackle means consisting of a rope or cable 25 fastened at one end to a U shaped bail 26 the arms of which are fastended to a transverse bolt 27 extending through the arms of the lever 21 adjacent to the outer end of the lever.

The rope or cable 25 passes around the pulley 10, before referred to, and thence around a pulley 28 rotatable on the bolt 27, and thence between the pulleys 10 and 11.

By pulling on the rope or cable 25, the lever 21 will swing the jaw 17—18 from the position shown in Fig. 1, past the position shown in Fig. 3 to the position shown in Fig. 2, thus causing the jaw portion 18 and the cutting edge 19 to move from the position shown in Fig. 1 to the position shown in Fig. 2, at which time an object between the jaws will be severed thereby.

In cutting a branch, the cutting edge 19 is disposed on top of the branch, and the projecting flange portions 15 and the upper end of the shank 1 bears against the under side of the branch. The swinging downwardly of the branch in being severed, assists in the cutting action of the cutting edge 19.

For retracting the lever 21, one end of a coil spring 29 is fastened to the lever 21 at the side of the bolt 22 opposite the bolt 23. Its other end is fastened to an eyebolt 30 extending through the tubular member 6 and the bar 12. The tension of the spring 29 retracts the lever 21.

In the form of my invention, shown in Figs. 5, 6 and 7, the construction corresponds to that of the form, just described and shown in Figs. 1, 2, 3 and 4, with the following defined exceptions.

The shank 1a of the fixed jaw corresponds to that of the shank 1 with the exception that its outer end is oblique to the longitudinal edge 5 of the shank, and slants away from the branch bearing ends of the projecting portions 15a of the flanges of the channel member. Also the flanges 3a of the channel member extend the width of the shank 1a and their upper ends are bevelled inwardly to form cutting edges, which cut into the adjacent side of the branch that is being cut, and are designated by 31.

The ends of the cutting edges 31 have concave portions which incline from the plane of the longitudinal edge 5 toward the adjacent oblique end of the shank 1a.

The inclination of the oblique end of the shaft 1a provides a space between it and the projecting flange portions 15a, through which space small portions of the objects severed are discharged.

The mode of operation and results obtained are the same in this form of my invention as has been described with reference to the other form, excepting with relation to cutting edges 31 of the channel member cutting into the object severed.

By having the said cutting edges bevelled inwardly, instead of outwardly, the pressure against the cutting edges 31 forces them inwardly slightly, thus preventing their liability to be be spread outwardly. They retract to the normal positions after the completion of the severing operation.

As shown in Fig. 5, in dotted lines, the cutting edge 19 extends slightly below the outer ends of the cutting edges 31, when the movable jaw 17—18 completes its cutting movement, thus affording a clean severance of the object cut.

As the movable jaw 18 is disposed with its cutting edge 19 in a plane between and parallel with the sides of the shank 1, 1a, and between the flanges 3, 3a, which flanges are rigidly attached to opposite sides of the shank and are connected by the bridge portion 4, the flanges are held from spreading and the movable jaw from lateral movement in the cutting operation.

The flanges 3, 3a perform three functions, that of guiding the movable jaw 18, of supporting the article to be severed, and of forcing the article forwardly to prevent small cut portions from crowding rearwardly into the channel at the rear of the shank 1, 1a. In the form shown in Fig. 5, they also cut the article.

Other modifications of my invention, within the scope of the appended claims, may be made without departing from the spirit of my invention.

What I claim is:

1. In a pruning implement, a fixed jaw comprising a longitudinal shank and a channel member having its flanges fastened to opposite sides of said shank at one end thereof, the bridge of said channel member being next to and spaced from one longitudinal edge of said shank, said flanges at one side of said edge having end portions projecting beyond said end of said shank, and adapted to bear against one side of an object to be cut, a movable jaw reciprocative in said channel member and having a cutting edge portion alined with and movable toward and from said shank end in a plane between and parallel with said projecting end portions and adapted to bear against the opposite side of said object, said movable jaw in its cutting movement sliding against said bridge, and means for reciprocating said movable jaw.

2. In a pruning implement, a fixed jaw comprising a longitudinal shank and a channel member having its flanges fastened to opposite sides of said shank at one end thereof, the bridge of said channel member being next to and spaced from one longitudinal edge of said shank, said flanges at one side of said edge having, projecting beyond said end of said shank, inwardly bevelled end portions forming cutting edges adapted to bear against one side of an object to be cut, a movable jaw reciprocative in said channel member and having a cutting edge portion alined with and movable toward and from said shank end in a plane between and parallel with said projecting end portions and adapted to bear against the opposite side of said object, said movable jaw in its cutting movement sliding against said bridge, and means for reciprocating said movable jaw.

3. In a pruning implement, a fixed jaw comprising a longitudinal shank and a channel member having its flanges fastened to opposite sides of said shank at one end thereof, the bridge of said channel member being next to and spaced from one longitudinal edge of said shank and having on its inner side a convex portion, said flanges at one side of said longitudinal edge having end portions projecting beyond said end of said shank and adapted to bear against one side of an object to be cut, a movable jaw reciprocative in said channel member and having a cutting edge portion alined with and movable toward and from said shank end in a plane between and parallel with said projecting end portions and adapted to bear against the opposite side of the object, said movable jaw in its cutting movement sliding against said convex portion, and a lever pivoted on two axes respectively to said jaws.

4. In a pruning implement, a fixed jaw comprising a longitudinal shank and a channel member having its flanges fastened to opposite sides of said shank at one end thereof, said end being oblique to one longitudinal edge of said shank, the bridge of said channel member being next to and spaced from said longitudinal edge, said flanges at one side of said longitudinal edge having portions projecting beyond said oblique end and having inwardly bevelled ends forming cutting edges adapted to bear against one side of an object to be cut, a movable jaw reciprocative in said channel member between and guided by said bridge and said longitudinal edge and having a cutting edge portion alined with and movable toward and from said oblique end in a plane between and parallel with said cutting edges and adapted to bear against the opposite side of said object, and means for reciprocating said movable jaw.

5. In a pruning implement, a fixed jaw comprising a longitudinal shank and a channel member having its flanges fastened to opposite sides of said shank at one end thereof, said end being oblique to one longitudinal edge of said shank, the bridge of said channel member being next to and spaced from said longitudinal edge, said flanges at one side of said longitudinal edge having portions projecting beyond said oblique end and adapted to bear against one side of an object to be cut, a movable jaw reciprocative in said channel member between and guided by said bridge and said longitudinal edge and having a cutting edge portion alined with and movable toward and from said oblique end in a plane between and parallel with said projecting flange portions and adapted to bear against the opposite side of said object, and means for reciprocating said movable jaw.

6. In a pruning implement, a fixed jaw comprising a longitudinal shank and a channel member having its flanges fastened to opposite sides of said shank at one end thereof, said end being oblique to one longitudinal edge of said shank, the bridge of said channel member being next to and spaced from said longitudinal edge, said flanges at one side of said longitudinal edge having portions projecting beyond said oblique end and adapted to bear against one side of an object to be cut, a movable jaw reciprocative in said channel member between and guided by said bridge and said longitudinal edge and having a cutting edge portion alined with and movable toward and from said oblique end in a plane between and parallel with said projecting flange portions and adapted to bear against the opposite side of said object, and a lever pivoted respectively on two axes to said jaws.

7. In a pruning implement, a fixed jaw comprising a longitudinal shank and a channel member having its flanges fastened to opposite sides of said shank at the end thereof, said end being oblique to one longitudinal edge of said shank, the bridge of said channel member being next to and spaced from said longitudinal edge, said flanges at one side of said longitudinal edge having portions projecting beyond said oblique end and having inwardly bevelled ends forming cutting edges adapted to bear against one side of an object to be cut, a movable jaw reciprocative in said channel member between and guided by said bridge and said longitudinal edge and having a cutting edge portion alined with and movable toward and from said oblique end in a plane between and parallel with said flange cutting edges and adapted to bear against the opposite side of said object, and a lever pivoted to said jaws on two axes respectively.

8. In a pruning implement, the structure defined in claim 1, with said projecting portions of said flanges having their ends slanting from the plane of said longitudinal edge of said shank toward said end of said shank.

9. In a pruning implement, the structure defined in claim 1 with said projecting portions of said flanges having their ends slanting from the plane of said longitudinal edge of said shank toward said end of said shank, and said end of said shank being oblique to said longitudinal edge of said shank.

10. In a pruning implement, the structure defined in claim 1, with said flange projecting portions having their ends slanting from the plane of said longitudinal edge of said shank toward the adjacent end of said shank and being bevelled inwardly to form cutting edges.

GEORGE W. NEWMAN.